US005461372A

United States Patent [19]

Busak et al.

[11] Patent Number: 5,461,372

[45] Date of Patent: Oct. 24, 1995

[54] SYSTEM AND METHOD FOR MODIFYING SECURITY IN A SECURITY SYSTEM

[75] Inventors: Steven J. Busak, Laguna Niguel; Allen F. V. Buskirk, Fountain Valley; Mark R. Walther, Laguna Hills, all of Calif.

[73] Assignee: Honeywell Inc., Minneapolis, Minn.

[21] Appl. No.: 6,223

[22] Filed: Jan. 19, 1993

[51] Int. Cl.[6] .................... G09B 13/00

[52] U.S. Cl. .................... 340/825.31; 340/825.32; 379/95; 379/103

[58] Field of Search .................... 340/825.31, 825.32, 340/825.22, 825.37, 541, 531, 825.36, 506, 533, 538, 532, 542; 379/95, 103, 37, 39, 42

[56] References Cited

U.S. PATENT DOCUMENTS

| | | | |
|---|---|---|---|
| 3,925,763 | 12/1975 | Wadhwani et al. | 340/825.36 |
| 4,287,939 | 9/1981 | Pohl et al. | 340/825.22 |
| 4,639;610 | 8/1987 | Dietrich | 340/515 |
| 4,755,792 | 7/1988 | Pezzolo et al. | 340/531 |
| 4,772,876 | 9/1988 | Laud | 340/531 |
| 4,808,995 | 2/1989 | Clark et al. | 340/825.32 |
| 4,931,769 | 9/1990 | Phillips et al. | 340/541 |

FOREIGN PATENT DOCUMENTS

| | | |
|---|---|---|
| 2150333 | 6/1985 | United Kingdom . |

*Primary Examiner*—Michael Horabik
*Attorney, Agent, or Firm*—Robert B. Leonard

[57] ABSTRACT

A system and method for modifying security levels within a security system. External modifications are allowed only if the security of a point is increased.

7 Claims, 10 Drawing Sheets

| | | MODES | | | | | | | | |
|---|---|---|---|---|---|---|---|---|---|---|
| FIGURE ID NO | NAME | POINT NO. | LEAVE | WAKE | POOL PARTY | WORK | SLEEP | PLAY | RETURN | OPEN |
| 1020A | WINDOW 1 | 1 | X | X | X | X | X | O | O | O |
| 1020B | WINDOW 2 | 2 | X | X | X | X | X | O | O | O |
| 1020C | WINDOW 3 | 3 | X | X | X | X | X | O | O | O |
| 1015A | DOOR 1 | 4 | X | O | OW | X | X | O | X | O |
| 1015B | DOOR 2 | 5 | X | O | X | X | X | O | X | O |
| 1015C | DOOR 3 | 6 | X | O | X | X | X | O | X | O |
| 1015D | DOOR 4 | 7 | X | O | ON | X | X | ON | X | O |
| 1040A | LIGHT 1 | 8 | P | O | Y | P | O | | | |
| 1040B | LIGHT 2 | 9 | P | O | | O | O | | | |
| 1040C | LIGHT 3 | 10 | P | Y | Y | P | O | | | |
| 1040D | LIGHT 4 | 11 | O | Y | | O | O | | | |
| 1040E | LIGHT 5 | 12 | O | Y | Y | O | O | | | |
| 1040F | LIGHT 6 | 13 | O | O | O | O | O | | | |
| 1040G | LIGHT 7 | 14 | P | Y | Y | O | O | | | |
| 1040H | LIGHT 8 | 15 | P | O | O | O | O | | | |
| 1040J | LIGHT 9 | 16 | O | O | Y | O | O | | | |
| 1040K | LIGHT 10 | 17 | O | O | Y | O | O | | | |
| 1035A | THERMOSTAT 1 | 18 | P | P | | P | P | | P | |
| 1035B | THERMOSTAT 2 | 19 | P | P | | P | P | | P | |
| 1035C | THERMOSTAT 3 | 20 | P | P | | P | P | | P | |
| 1055 | OUTLET | 21 | P | | | | | | | |

X=ARMED
P=PROGRAMMED
O=OFF
Y=ON
OW=ON WATCH
BLANK=NO EFFECT OVER PREVIOUS STATUS

Fig. 7

SYSTEM AND METHOD FOR MODIFYING SECURITY IN A SECURITY SYSTEM

BACKGROUND OF THE INVENTION

1. Field of the Invention

The present invention includes a system for automatically controlling a space by integrating the control and function of a plurality of control systems and devices utilized within the space, by using a principal control system, such as a security system. These control systems and devices can include an environmental control system, a telecommunications system, a lighting control system, and other electrical control systems including those which control individual electrical or electronic devices such as appliances, audio devices and video devices.

The invention can be accessed by a user from within the space to be controlled, or remotely through the use of a telecommunications interface. The control systems may be separately operable, although not automated, when used without being connected to the principal control system, or when the principal control system has failed.

2. Description of Related Art

Small building security systems for sensing and reporting intrusions into a building are well known in the art. Typically, a plurality of sensors, such as motion sensors, door sensors, window sensors and other sensors are connected to a processor to provide the processor with an alarm indication, such as movement or the opening of a door or window. The processor is preprogrammed to initiate certain actions upon the receipt of an alarm indication, such as sounding an internal alarm signal or dialing a remote alarm monitoring station through a telecommunications interface. For the small building market (house, small retail store, restaurant) these systems have been relatively simple.

Improvements in alarm systems include the ability to define in the processor, certain security levels which will cause the processor to handle alarm indications from a sensor in a predetermined way. For example, three levels of conditions for the handling of an alarm indication may be defined: 1) armed; 2) on watch; and 3) off. A sensor whose alarm indication is to be handled as armed, may cause the processor to initiate a call to the remote alarm monitoring station and to create a local alarm signal when an alarm indication occurs at the armed sensor. A sensor whose alarm indication is to be handled as on watch, may cause the processor to initiate a local alarm only when an alarm indication is received from that sensor. Lastly, a sensor whose alarm indication is to be handled as off may cause the processor to ignore any alarm indication received from that sensor. Typically, the highest level of security is armed, next is on watch, and the lowest is off.

Typically, each sensor may be associated with any of the above identified levels. This is typically done through an operator interface which is connected to the processor. The processor may be programmed to identify each sensor with a level individually, or "modes" of operation may be defined where all sensors connected to the security system are set to one of the predefined levels upon the selection of a preprogrammed mode.

As building control systems for small buildings have continued to evolve, integration of alarm systems with other building control systems, such as the HVAC and lighting systems has occurred. For description of a complete system, see U.S. patent application Ser. No. 07/811,508 (abandoned in favor of continuing application Ser. No. 08/216,783), entitled A SYSTEM AND METHOD FOR AUTOMATICALLY CONTROLLING A SPACE, by Stanley-Arslanok et al. which is commonly owned by the assignee of the present application.

In addition, recent improvements in telecommunications technology allows the building owner to use a telephone, either from inside or outside the protected building, to modify the status of the alarm system. This may cause the building owner some concern with the proliferation of hackers who attemp to break into computer systems to modify the programming of those systems. If a hacker were to break into the alarm system via the telecommunictions network, security of the protected building could be comprised.

SUMMARY OF THE INVENTION

The present invention is a security system which prevents a lowering of the security level of the alarm system from a phone not located within the protected building. The security system can be operated via a plurality of input devices, including a security panel, or panels located in one or more locations within the home, telephones located within the home via a voice module, and remotely from a telephone or similar telecommunications device also via the voice module. However, the security system may only increase the level of security through the use of an external phone. The security system may be connected to other control systems such as HVAC or lighting control systems.

The security system includes a processor having memory, one or more sensors connected to the processor, and telecommunications interface connected to the alarm processor. The processor includes a discrimination means for determining where a phone is located which is initiating control actions for the security system. If the phone is determined to be outside the protected space, any control actions initiated through the phone which cause a decrease in security are ignored. Control actions of other control systems connected to the security system which are initiated through the external phone are allowed to occur.

The discrimination means may be implemented by a routine performed by the processor. A flag may be set in memory which either allows or prohibits an operator from lowering the security level of a point when operating the system from outside the protected area.

Other objects, features and advantages of the invention may be apparent to one of ordinary skill in the art, upon examination of the drawings and detailed description of the preferred embodiment.

BRIEF DESCRIPTION OF THE DRAWINGS

FIG. 7 is a matrix of modes, statuses and points within the house of FIG. 7.

DETAILED DESCRIPTION OF THE PREFERRED EMBODIMENT

Figure 1:
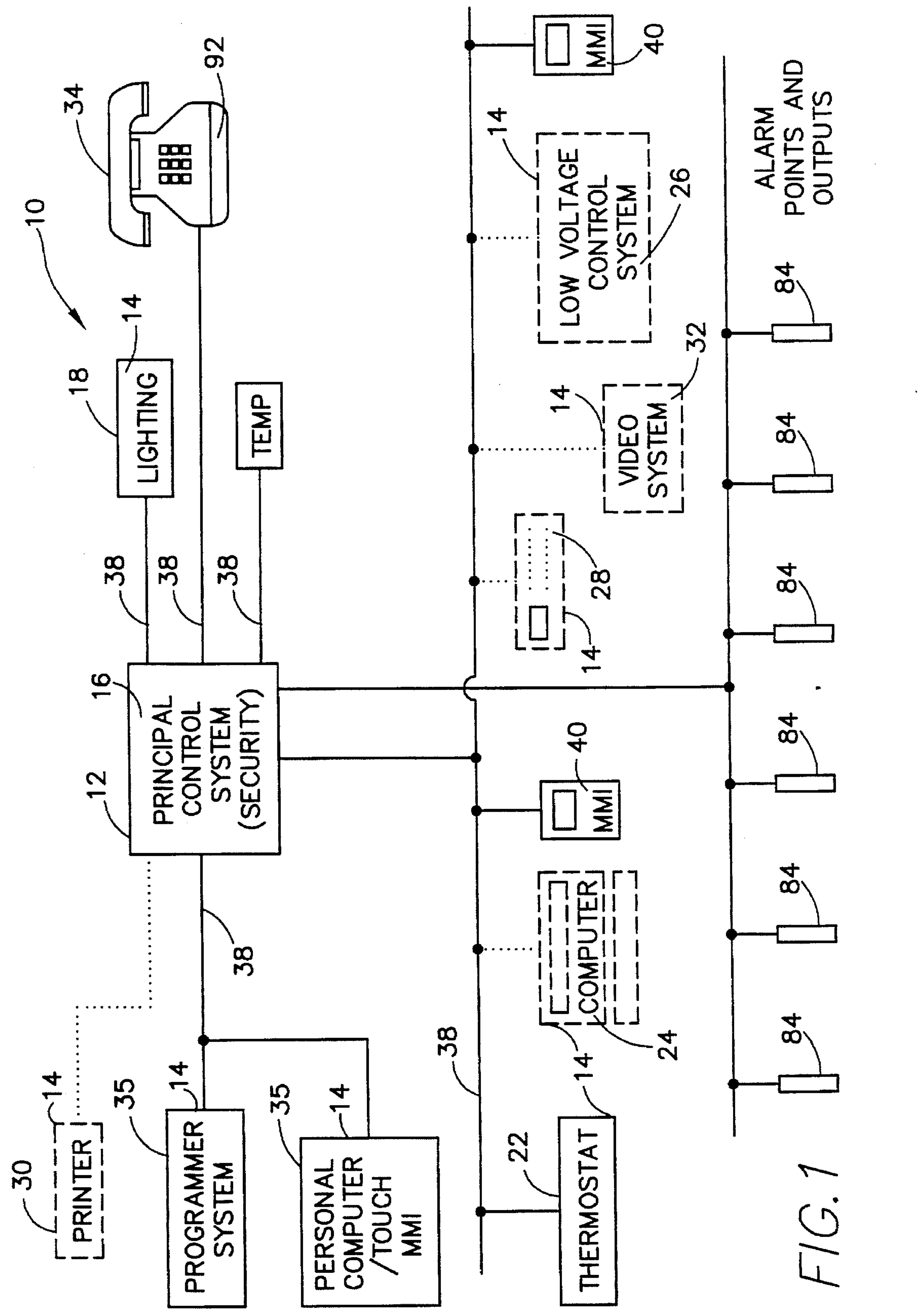
FIG. 1 is a block diagram of an embodiment of a system for automating the control of a space, featuring a security system as a principal control system, a plurality of control systems, and the interconnections between the security system and the plurality of control systems.

Referring now to FIG. 1, an automation system 10 for automatically controlling a space is illustrated. In a preferred embodiment of the invention as described herein, automation system 10 would be particularly suitable for automatically controlling a building, such as a small commercial building, a home, or a similar building. Automation system 10 comprises a principal control system 12 connected to a plurality of control systems 14. In a preferred embodiment of the invention, principal control system 12 is security system 16 electrically connected to plurality of control systems 14, including lighting system 18 and thermostat 22. Other control systems 14 could be electrically connected to security system 16, including personal computer system 24, low voltage control system 26, entertainment system 28, printer system 30, and video system 32, as well as any number of other systems which might be located in or near the building, and including systems which could be remote from the building and interconnected via telecommunications device 34 or otherwise. In a preferred embodiment of the invention, a control system 14 which could be remote from security system 16, could include programming system 35. The following describes security system 16, plurality of control devices 14 and their interconnection.

Figure 2:
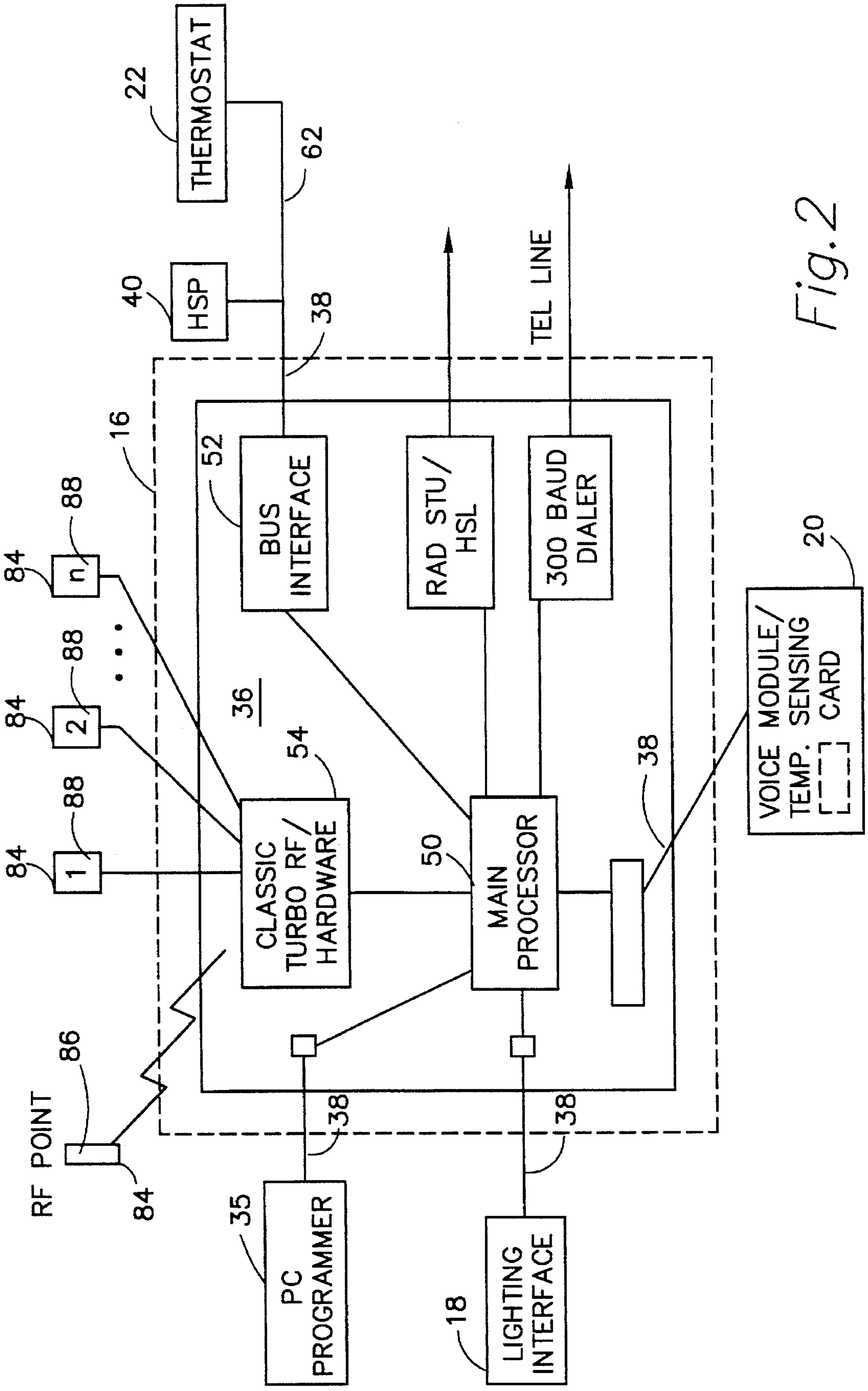
FIG. 2 is a block diagram of the security system of FIG. 1, illustrating the general location and interrelation of certain principal elements.

Referring now to FIG. 2, security system 16 includes several principal elements including control panel 36, interconnections 38, one or more home security panels (HSP) 40, and plurality of control points 84.

Figure 3A:
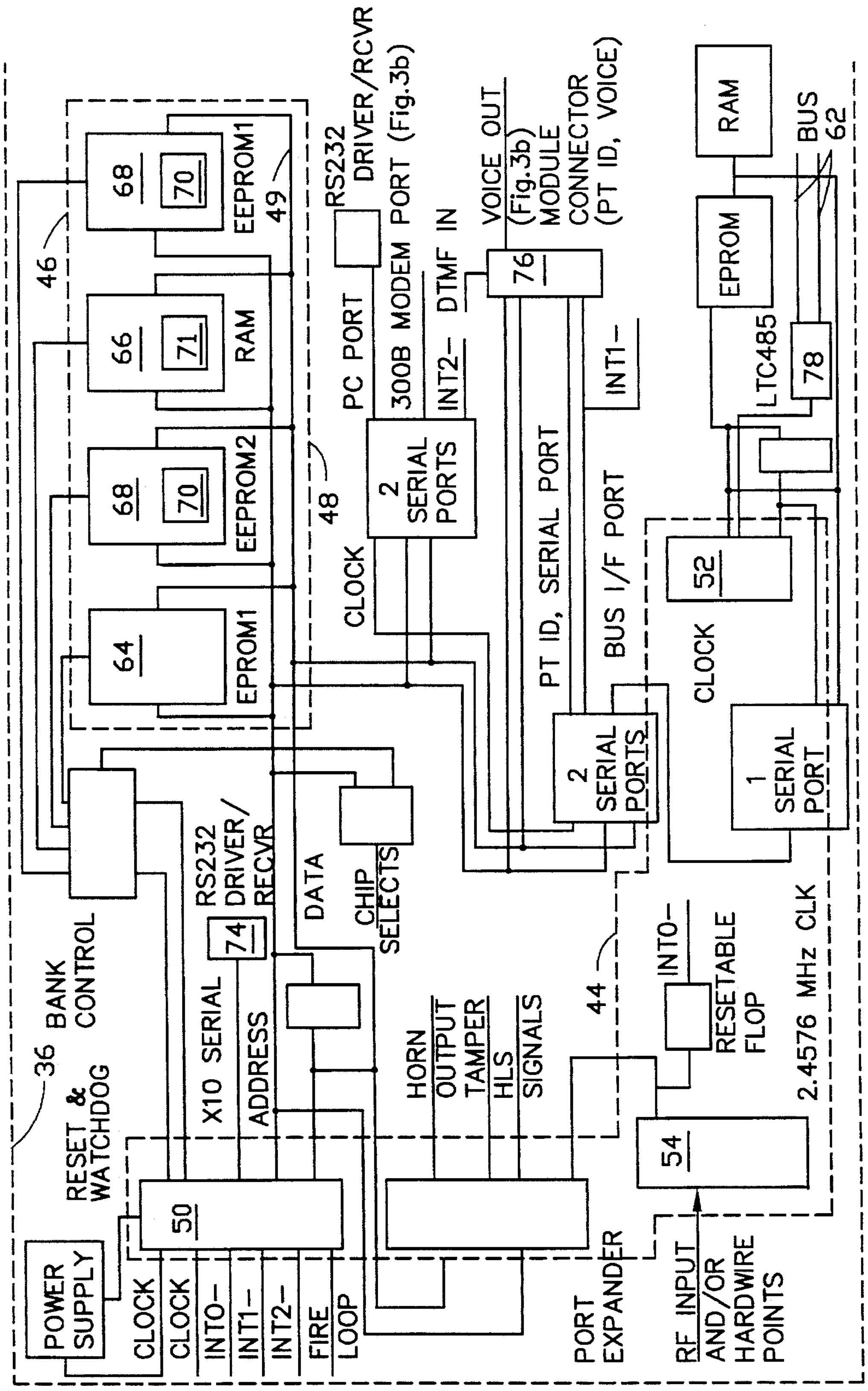
FIG. 3*a* is a more detailed functional block diagram of the security system of FIG. 2.

Referring now to FIG. 3*a*, control panel 36 comprises processor means 44 and memory means 46 which are interconnected by address line 48 and data line 49. In a preferred embodiment, processor means 44 comprises a plurality of separate processors including main processor 50, data bus processor 52 and control point processor 54, however, processor means could also be implemented in a single device. In a preferred embodiment, the three processors are all 8-bit microprocessors or microcontrollers, and are all interconnected via address line 48 and data line 49.

Main processor 50 is the principal data processing device for automation system 10 (not illustrated). It is capable of providing a plurality of output signals 38, for transmission to the plurality of control systems 14, in response to the receipt of a plurality of input signals 60 (not shown). Input signals 60 can be provided from systems and devices comprising control systems 14, HSP 40 and other systems and devices capable of providing input signals 60. Main processor 50 is capable of transmitting to, and receiving signals from, other processors, such as data bus processor 52 and control point processor 54, and other devices.

Referring now to FIGS. 2 and 3*a*, data bus processor 52 controls the communication of information between main processor 50 of security system 16 and control systems 14, such as thermostat system 22, as well as other devices which are connected to data bus 62, such as HSP 40. The exchange of information between data bus processor 52, control systems 14, and devices such as HSP 40, is accomplished through the use of an encoded (4B-8B) data stream utilizing a code, and a method of receiving and transmitting the code described in the co-pending application, "A DC Balanced 4B/8B Binary Block Code for Digital Communications", filed as U.S. application Ser. No. 07/811,508, now abandoned in favor of continuing application 08/216,783, by D. Myers, which is hereby incorporated by reference.

Control point processor 54 is capable of receiving a plurality of inputs from control points 84, and transmitting the input information to main processor 50 via address line 48 and data line 49.

As described herein, in addition to processor means 44, control panel 36 also comprises memory means 46. In a preferred embodiment, memory means 46 comprises a combination including Electrically Programmable Read Only Memory (EPROM) 64, Random Access Memory (RAM) 66 and Electrically Erasable Read Only Memory (EEPROM) 68. Particularly, memory means 46 is capable of storing a preprogrammed set of instructions 70 relating to a set of control conditions or modes desired within the building, and providing these instructions to main processor 50 via address line 48 and data line 49 in response to a request made by an operator.

Referring now to FIGS. 2 and 3*a*, having described the elements of control panel 36, automation system 10 also comprises plurality of interconnections 38 to provide for the connection of principal control system 12 and plurality of control systems 14. In a preferred embodiment, this arrangement comprises security system 16 interconnected with control systems 14, such as lighting system 18, voice access system 20 and thermostat 22, via lighting interconnection 74, voice access interconnection 76 and Hbus interconnection 78, respectively. In a preferred embodiment, these interconnections are all accomplished via digital data interfaces.

Referring now to FIG. 3*a*, lighting interconnection 74 is accomplished via a direct RS232 serial interface to main processor 50. Voice access interconnection 76 to main processor 50 is accomplished via address line 48 and data line 49, and thermostat interconnection is accomplished via a data bus using an RS485 serial interface to data bus processor 52, which is in turn connected via a serial interface to main processor 50.

Figure 4:
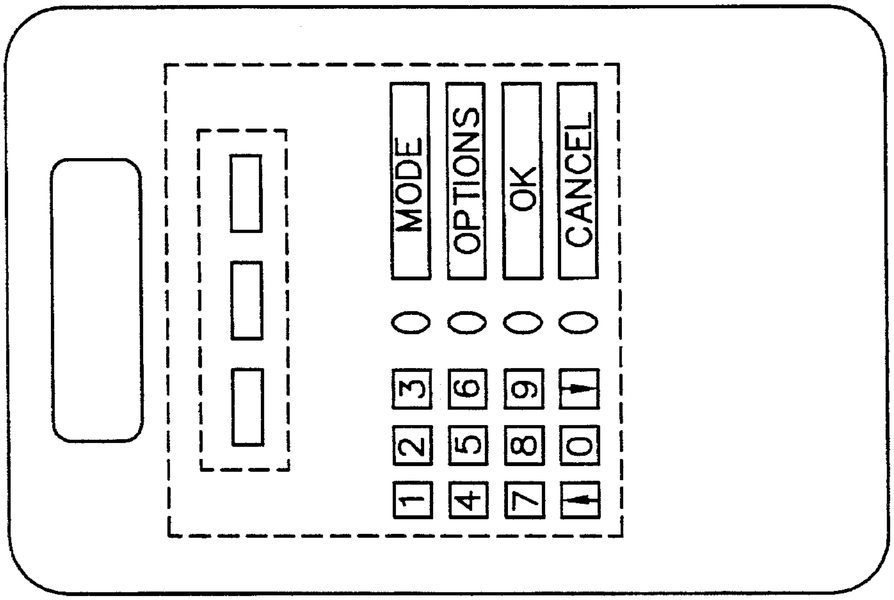
FIG. 4 is a front view of the home security panel.
Figure 5:
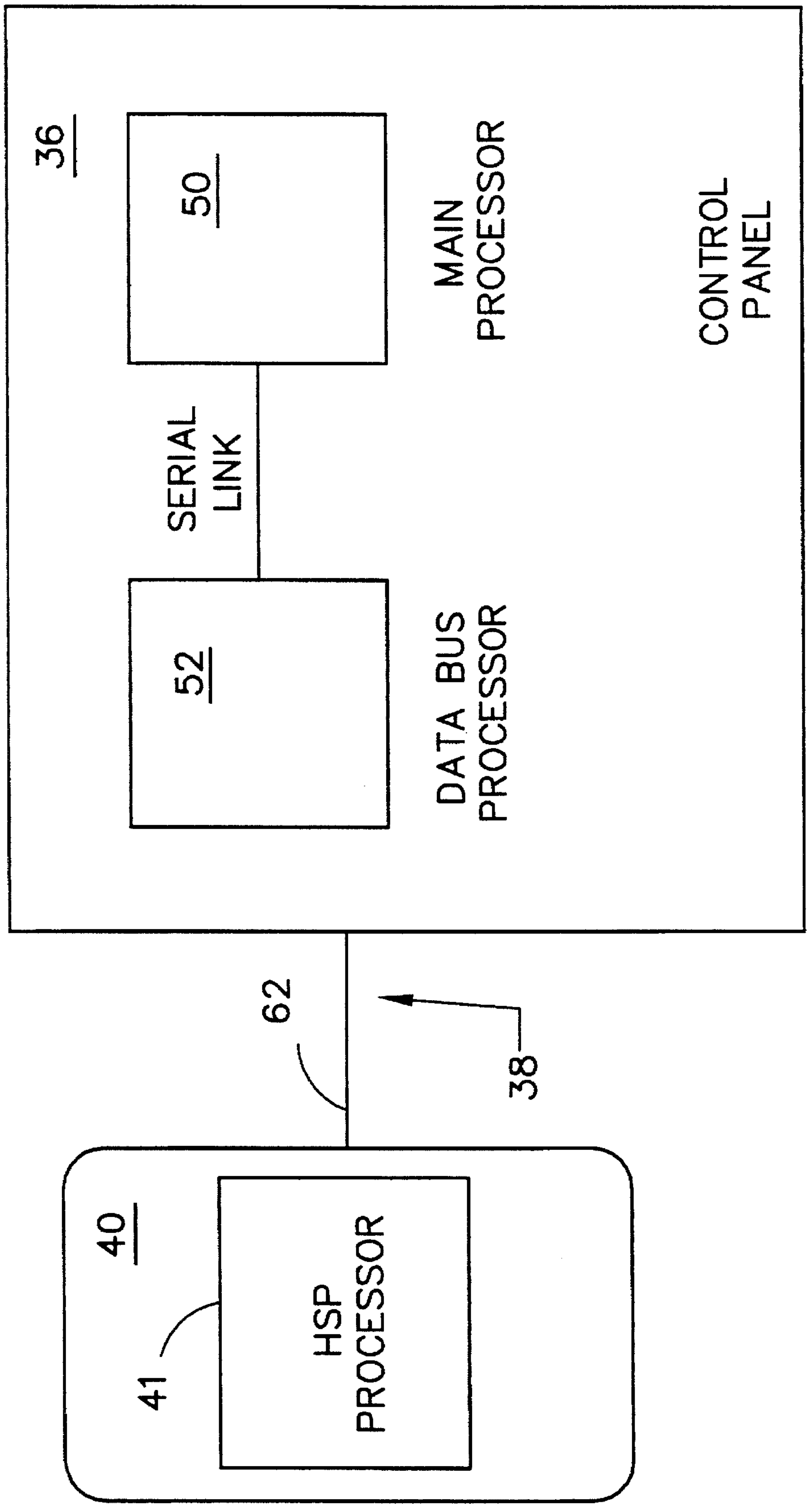
FIG. 5 is a block diagram of a home security panel showing its interconnection to the control panel.

Referring now to FIG. 4, security system 16 also comprises an HSP 40, which is now further described. HSP 40 is a man-machine interface (MMI). In a preferred embodiment, the MMI comprises a touch key-pad 80 and a display 82, such as a liquid crystal display. Display 82 is capable of identifying for an operator the available choices with respect to control of the security system 16, as well as displaying certain indications of system status, such as time, date, temperature, and current mode 82. In one embodiment, touch key-pad 80 has, on the key-pad, a combination of numeric keys, arrow symbol keys and word keys to facilitate operator selections, as discussed further herein, and as shown in FIG. 4.

Referring now to FIG. 2, security system 16 also comprises control points 84. Control points 84 include two types of security points, RF points 86 and hardwire points 88. These control points are of a type well known in the art, such as those utilized in any one of the System 6000 series security systems manufactured and sold by Honeywell Inc., such as model 6400, and are interconnected to control panel 36 through control point processor 54, using interconnection methods and materials known to those of ordinary skill in the art. The exact number of RF points 86 and hardwire points 88 is a function of the capabilities of control point processor 54. Various adapters are known to those of ordinary skill in the art which can be utilized to expand the number of control points 84 which can be attached to control point processor 54. Control point processor 54 is capable of monitoring and exercising control over individual control points 84, and providing information about any individual control point 84 to main processor 50. Therefore, this information is available to security system 16, and particularly so that modes can define desired states of control, such as armed, disarmed and on-watch, as further described herein, for either individual control points, or groups of control points, depending on the requirements of the particular mode.

Automation system 10 comprises principal control system 12 and a plurality of control systems 14. In a preferred embodiment, automation system 10 comprises security system 16, the elements of which are described herein, and control systems 14, including lighting system 18, voice access system 20, thermostat system 22, and programmer system 35, and may also include individual devices such as telecommunication device 34, which are further discussed below.

Lighting system 18 is a commercially available system sold by X-10 Powerhouse, as Model No. CP290, and is of a type known to those of ordinary skill in the art. Lighting system 18 uses powerline carrier based signal to automatically switch power on or off to control modules, which can be used in conjunction with lights and other electrical appliances and devices. Its use is not limited to lighting devices only. For instance, lighting system 18 could be used to control appliances such as a coffee maker, electric heater, or other devices which can be operated by on/off switching of AC power. Lighting system 18 is connected to security system 16, using lighting interconnection 74, and is capable of receiving a control signal from security system 16. In a preferred embodiment, lighting system 18 is capable of operation independently of security system 16, in the event that security system 16 ceases to provide control signals as described above.

Figure 3B:
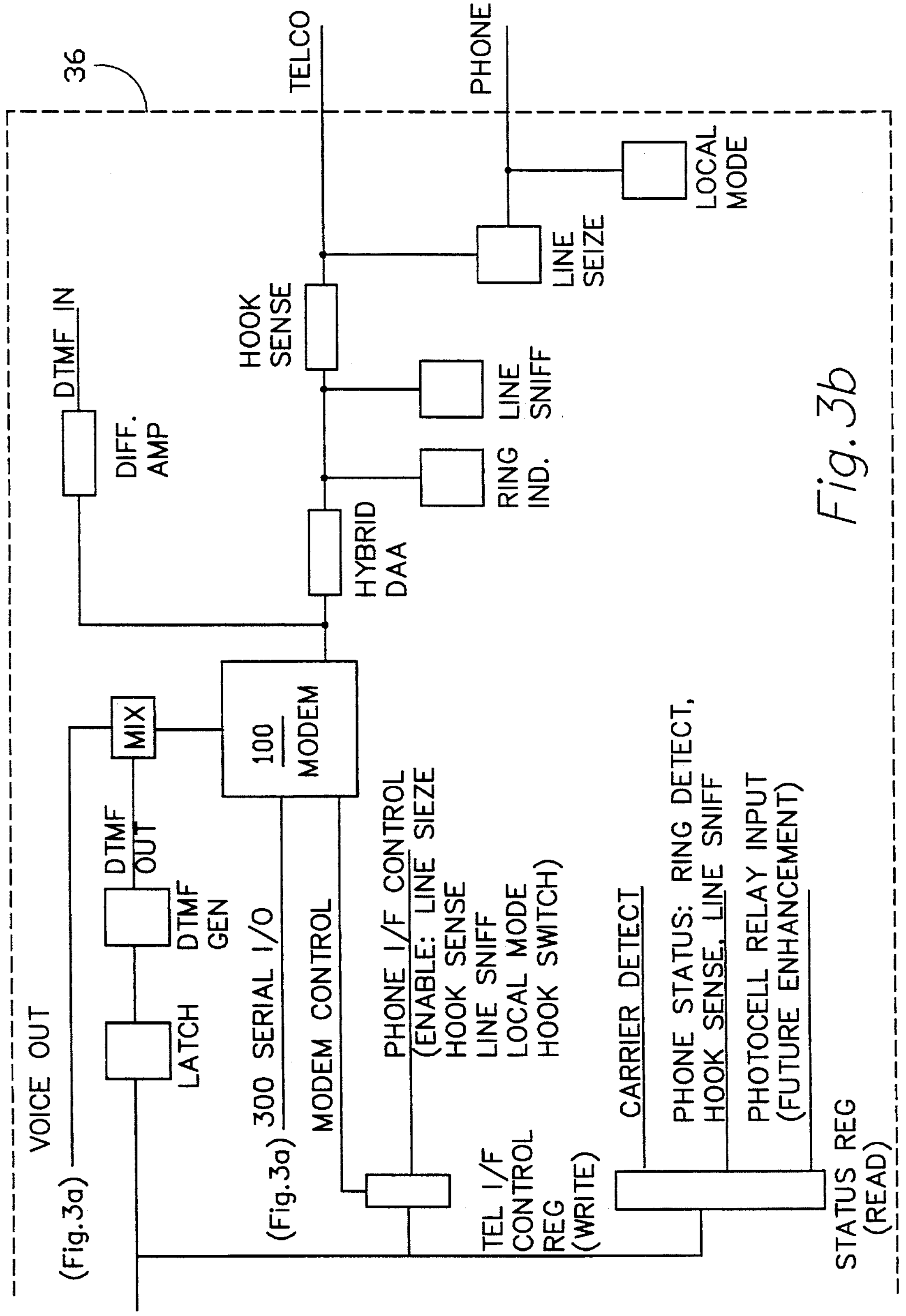
FIG. 3*b* is a continuation of the functional block diagram of FIG. 3*a*.
Figure 6:
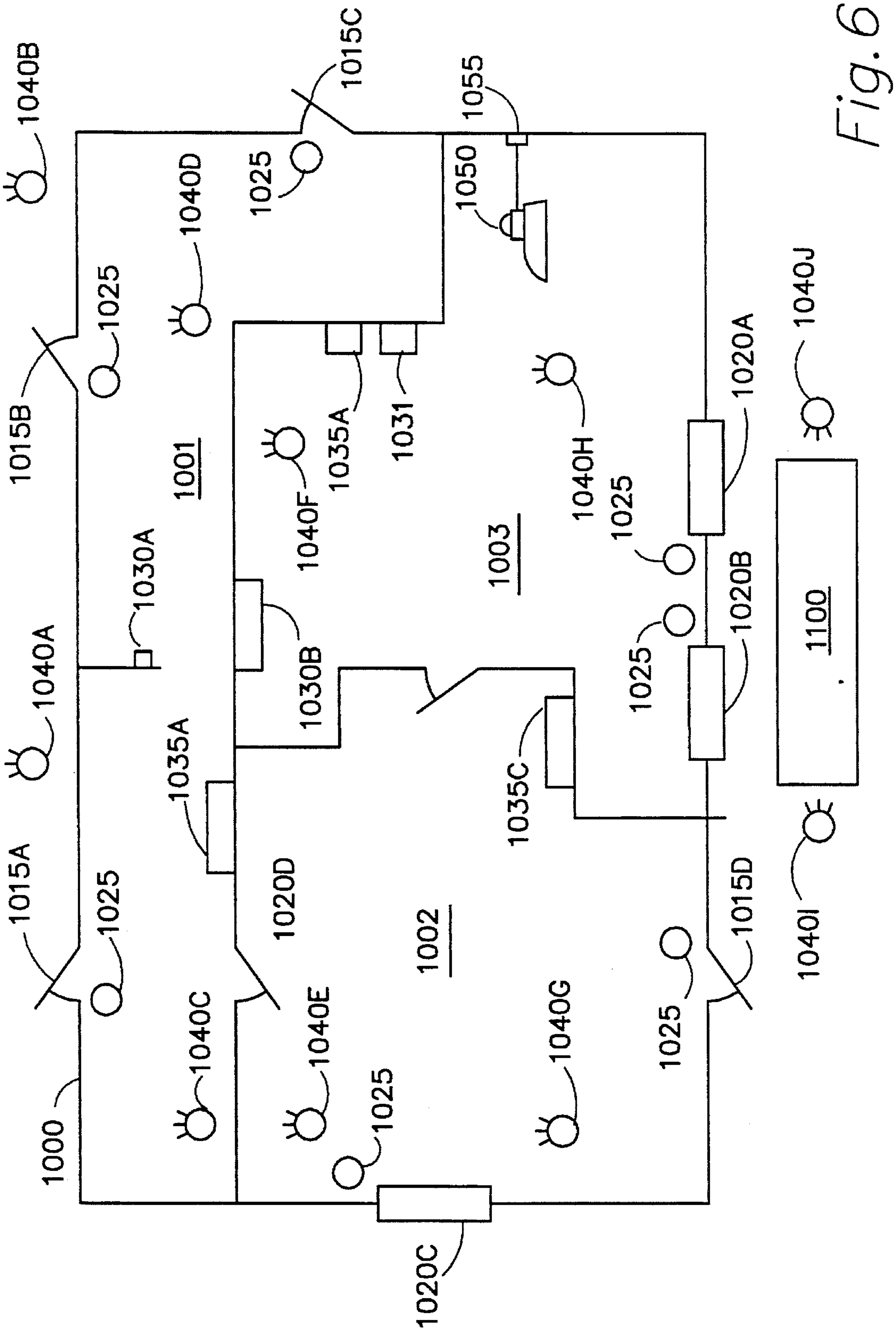
FIG. 6 is a floor plan of a sample house using the inventive system.
Figure 6A:
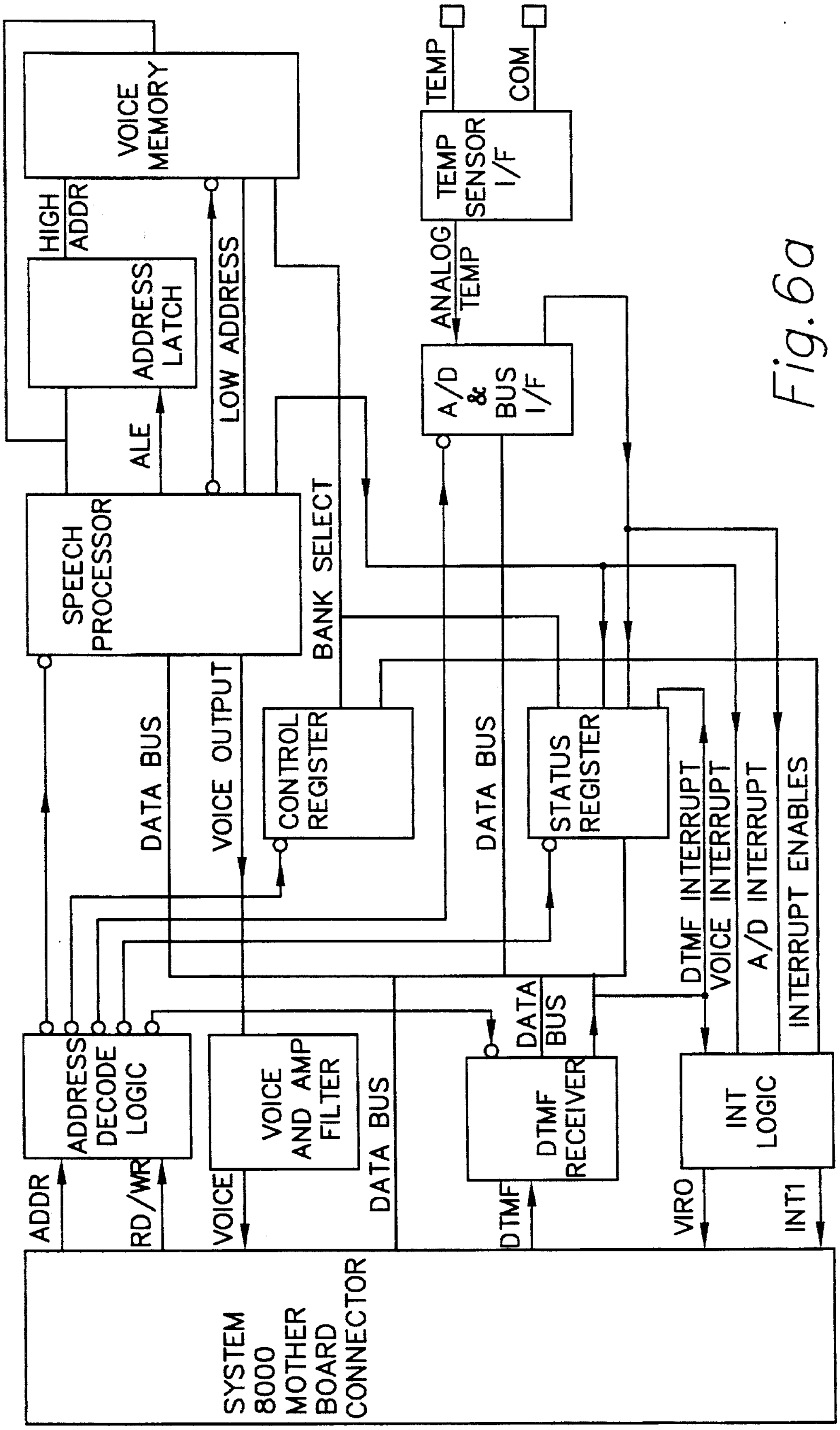
FIG. 6*a* is a block diagram of a voice access system of the present invention.
Figure 8:
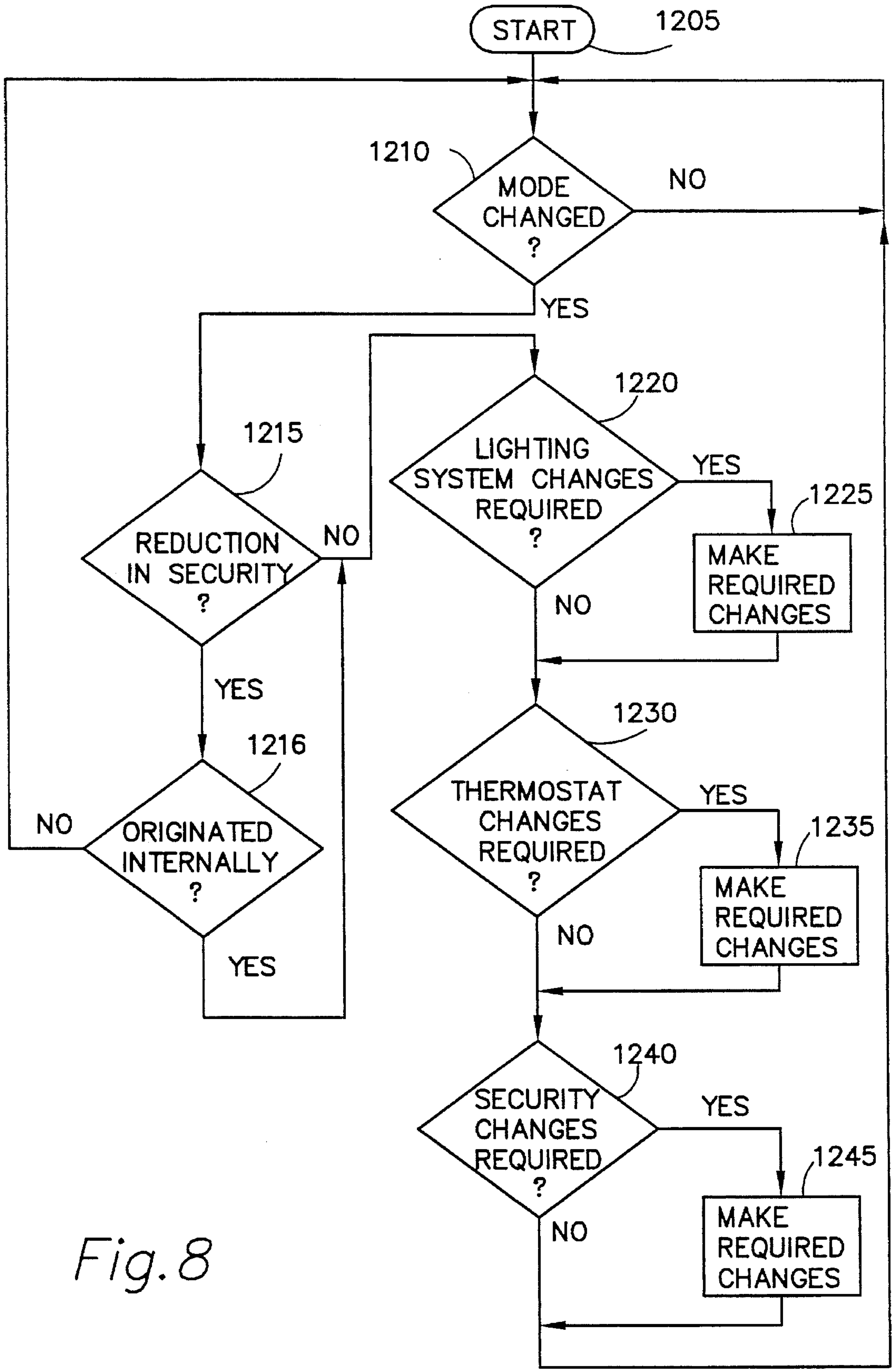
FIG. 8 is a flow chart of the method of operation of the inventive system.

Voice access system 20 is shown and described in FIGS. 6a and 3b. Voice access system 20 incorporates speech synthesizer 90. Speech synthesizer 90 is combined with components known to those of ordinary skill in the art, as described in FIG. 6a, to produce a system which allows an operator to operate security system 16 remotely through the use of telecommunications device 34, such as a touch tone telephone 34. Voice access system 20 allows an operator to operate a security system 16 remotely, by selecting the same modes that are available to the operator through HSP 40. Touch tone telephone 34 can be a telephone located in the space to be controlled, such as one or more of touch tone telephones located in a building, or, touch tone telephone 34 may be remote from the space which is to be controlled, such as a cellular telephone or telephone located in another building. Voice access module 20 also allows an operator to receive certain information from various control systems 14 which are adapted to communicate information concerning their status. Voice access system 20 also may also incorporate security features which require that an operator enter certain passcodes before being able to effect changes to security system 16. In particular, passcode entry may be required whenever the level of security is to be reduced. Note that FIG. 8 shows another security measure for preventing some decreases in security. Voice access system 20 also incorporates a voice-based menu scheme wherein voice access system 20 describes to an operator the various selections which are available, and provides the operator directions as to how to make a particular selection of choice. In a preferred embodiment, control may be exercised through voice access system 20 over various elements of an automation system 10, such as security system 16, lighting system 18, and thermostat system 22. Voice access system 20 is connected to security system 16 as described herein, via voice access interconnection 76.

Thermostat system 22 comprises a thermostat of the type described in U.S. Pat. No. 4,606,401 to Levine, et al., and U.S. Pat. No. 4,469,274 to Levine, et al., which are hereby incorporated by reference. Thermostat system 22 comprises a communicating thermostat, such as is described in the following copending applications: "Communicating Thermostat", Ratz, et al., U.S. Pat. No. 5,197,668; and "Communicating Thermostat", Ratz, et al., U.S. Pat. No. 5,203,497 and "Electronic Time Thermostat with a Temporary Next Period Adjustment Means", U.S. Pat. No. 5,230,482, all of which are commonly owned by the owner of the present application. Thermostat system 22 is capable of receiving control signals from security system 16, such that the features which are available to an operator from thermostat system 22, such as the availability to define certain set-back and set-up times and temperatures, from security system 16. Thermostat system 22 is also capable of being interrupted by security system 16 to define a NOW and NEXT time and temperature, such that the control of security system 16 may allow an operator to, upon invocation of certain modes, define a current control temperature which corresponds to "NOW" and a future control time and temperature which correspond to "NEXT". Thermostat system 22 is also capable of transmitting status information to security system 16 regarding the status of the control conditions of thermostat system 22, comprising current setpoints, current time settings and other parameters having to do with the schedule related to certain programmed setback/set-up schedules. Thermostat system 22 is connected to security system 16 via Hbus interconnection 78.

Programmer system 35 may be utilized to define modes for security system 16, by programming instructions related to the control of security system 16 and various of control systems 14, into memory means 46. Programmer system comprises a computer, such as a computer which is capable of executing Disk Operating System (DOS) such as are known to those of ordinary skill in the art, and a program for defining a particular mode. The program converts certain menu options related to control conditions of the various elements of automation system 10 to define a particular mode. A plurality of modes can be defined by the program and can be transferred to memory means 46 using a single step, or series of steps.

Having described security system 16 and control systems 14, including lighting control system 18, voice access system 20, thermostat system 22 and programmer system 35, the functions of these systems together is further described hereinbelow.

Prior to utilization of security system 16, security system 16 must have preprogrammed instructions 70 defining the control instructions necessary to operate security system 16 and control systems 14, stored in memory means 46. These preprogrammed instructions 70 define certain modes as described herein. This can be accomplished by connecting programmer system 35 to security system 16 via a modem, or by connecting programmer system 36 directly to security system 16 through a serial digital interface, such as an RS232 serial interface. Once programmer system 35 has been connected to security system 16, preprogrammed instructions 70 can be stored in memory means 46. Once this has been accomplished, security system 16 is available for use by an operator.

In order to operate security system 16, an operator must make a selection of a mode. This can be accomplished in one of several ways. First, selection of a mode can be accomplished by utilizing HSP 40. Secondly, a touch-tone telephone 92 located within the building can be utilized. Also, a touch-tone telephone 92 located outside of the space to be controlled can be used.

Referring now to FIG. 3*a*, once a mode has been selected, main processor 50 will retrieve preprogrammed instructions 70, 71 from memory means 46, corresponding to the selected mode. Then main processor 50 will execute preprogrammed instructions and provide control signals to control systems 14, for which preprogrammed instructions 70, 71 have designated to provide a function in the mode selected. During the selection process, preprogrammed instructions 70 and 71 may also require either passcode entry from touch-key pad 80 in order to ensure that an operator has sufficient authority to implement the mode selected or that reduction in security level be denied because the operator has accessed the system from outside the protected area. Instructions 70, 71 perform the discrimination for determining whether a level reduction is requested from inside or outside the protected area.

Once a mode has been selected and control signals have been provided to security system 16 and effected control systems 14, the systems perform their control functions until a different mode is selected by an operator. This method of operation centers utilization of automation system 10 on certain security-based events. It is important to note, however, that control systems 14 may also incorporate time-based programming. For example, lighting system 18 may have certain time-based program instructions, such that while lights may be turned on or off intially upon execution of a mode, subsequent programming instructions within lighting system 18 may direct subsequent changes to the on/off condition of lights affected at the outset of this mode, or other lights or appliances which are capable of being controlled by lighting system 18. Similarly, thermostat system 22 may exercise time-based program events such as set-back of the temperature or set-up of the temperature based on local program instructions after a particular mode has been initiated. Further discussion regarding the implementation of modes is set forth hereinbelow.

When programmer system 35 accesses system 16 remotely via modem 100 shown in FIG. 3*b*, it is first may be necessary to ensure that the call into modem 100 is from programmer 35. In order to ensure this fact, security system 16 may incorporate a methodology known as the "pizza" principle, wherein when system 16 receives a telephone call, system 16 does not allow direct access to the calling device. Rather, security system 16 has resident in memory means 46, a preprogrammed instruction corresponding to a call-back telephone number. Upon receipt of a call by modem 100, security system 16, places a call through modem 100 using the telephone number which has been preprogrammed into memory means 46. In this way, it can be ensured that access for the purpose of programming security system 16 can only come from authorized locations.

This presents a problem, however, during the initial programming of memory means 46, as described herein, because one of the items of information that must be programmed in is the preprogrammed instruction 70 related to the call-back telephone number. Therefore, initial programming would not normally be possible from a remote location. However, security system 16 also incorporates in memory means 46, an authorization code related to the call-back feature. The code has associated with it a set of preprogrammed instructions 70, which instruct security system 16 to accept telephone calls from remote devices for a predetermined time period, such as fifteen minutes. Therefore, by entering a predefined passcode at HSP 40, an operator can cause main processor 50 to retrieve preprogrammed instructions 70 from memory means 46, directing that security system 16 disable its normal security provisions as described above, and accept a telephone call through modem 100 directly, without requiring that security system 16 do a call-back to initiate communication.

Returning now to FIG. 6, there shown is a sample building incorporating a home automation system of the present invention. House 1000 is made up of rooms 1001, 1002 and 1003. House 1000 also has four doors 1015*a* through 1015*d*, and three windows, 1020*a* through 1020*c*. Associated with each door and window is a sensor 1025 for monitoring the position of the door or window. Also included in the house are thermostats 1035*a* and *b*, security alarm operator panels 1030*a* and 1030*b*, security alarm control panel 1031 and lights 1040*a* through 1040*j*. House 1000 also has a swimming pool 1100. Lastly, iron 1050 is connected to relay outlet 1055, which is controlled by control panel 1031.

Control panel 1031, as described before, controls the home security, lighting, appliance and thermostat controls, although the lighting control system and the thermostat control system can operate independently of control panel 1031. Changes to operation of the thermostat, lighting, appliance and security system can be effected through entries into security panels 1030*a* and 1030*b*. Prestored modes of operation for all of the systems can be entered at the security operator panels.

Referring now to FIG. 7, there shown are a plurality of possible modes for the controlling of the lighting, security and thermostat systems in House 1000. The various modes are titled, LEAVE, WAKE, POOL PARTY, WORK, SLEEP, PLAY, RETURN and OPEN. Note that in the matrix of FIG. 8, an X indicates an armed security point, a P indicates program control of a particular light or thermostat, O indicates that a particular point is off, a blank space indicates that the point is unchanged over its previous condition, Y indicates that a point is turned on, and OW indicates that a point is on watch. A point that is on watch still provides an alarm indication to the control panel. However, the control panel merely provides an indication of the point opening within the building rather than sending an alarm indication to, for example, the police. The highest level of security in this case is armed, next is on watch, and lowest is off.

In the LEAVE mode, all access point sensors are armed, while lights 1, 2, 3, 7 and 8 are put into program mode, as are thermostats 1, 2 and 3. Program mode indicates that a point is not only being controlled by an event, but also by time. There are a number of programs available for use with a particular point. One program may wait until a predetermined time is reached according to a clock and then initiate some action. Another program may have a point in an on condition for a predetermined time after a mode has been entered, and then turn off. Yet another program may insure that a point is off regardless of the previous status of the point. In the case of lights 1, 2, 3, 7 and 8, each light may be individually programmed to turn on or off at a particular time. The operator may enter a mode at the security panel. Thereafter the control panel will send the program to the individual systems. The individual systems then compare the clock time to the program times, and turn the lights on at the times entered by the user. This process is the same for the thermostat, lighting control and appliance control systems as well.

The iron 1050 may be turned off by controlling the relay in relay outlet 1055 thus insuring that the iron is not left on after the occupant departs.

Thermostat program causes the thermostat to go to a user selected setpoint when a particular mode is entered. Thermostat setpoint for the LEAVE mode may be different from the thermostat setpoint for the WAKE mode. The security panel may request from the operator a return time so that the thermostat setpoint can be adjusted to the anticipated return time of an occupant.

In the WAKE mode, windows 1, 2, and 3 remain armed while doors 1, 2, 3 and 4 are disarmed. Lights 1, 2, 6, 8, 9 and 10 are turned off, while lights 3, 4, 5 and 7 are turned on. Again, thermostats 1, 2 and 3 may be set to preprogrammed setpoints. Note that the status of doors 1, 2, 3 and 4 has not changed over the previous period.

The mode entitled POOL PARTY may be useful where the owner of House 1000 desires to have a party around the swimming pool. In this instance, all windows remain armed, as do doors 2 and 3. However, doors 1 and 4 are placed on watch to allow access to the pool through the house, while providing only local indication of the opening of the point. Lights 1, 3, 5, 7, 9 and 10 are forced on, and providing lighting to and at the swimming pool. Note that lights 2 and 4 remain in the same status that they were in prior to entry of the mode POOL PARTY, so that other occupants of the house are unaffected by a change in the mode. Lights 6 and 8 are forced off to indicate that no one should enter room 1003. In addition, the thermostat setpoints are unchanged, because it may remain desirable to keep the already-reached setpoint.

The mode entitled WORK arms all access points, and programs lights 1 and 3 to turn on at a preselected time. This allows the house to appear occupied even though the owner of House 1000 may not have yet arrived back at home. Lights 2, 4, 5, 6, 7, 8, 9 and 10 are forced off to save energy. Thermostats 1, 2 and 3 may enter a programmed setback mode in which temperature during the heating season is reduced over when the building is occupied and, during the cooling season, and increased over when the building is occupied.

The mode entitled SLEEP arms all access points and turns off all lights. In addition, thermostats 1, 2 and 3 have their setpoints modified to a lower temperature during the heating season, and a higher temperature during the cooling season.

The mode entitled PLAY could be used, for example, when children are to play in room 1002, but the parents wants to ensure that there is no playing near the swimming pool. Door 4 remains in an on watch status. This way, a local indication of the change in point status occurs. In addition, no changes in light status or thermostat status occur in this mode.

The mode entitled RETURN arms doors 1, 2, 3 and 4 while modifying the thermostat setpoint. This could be used, for example, where a LEAVE mode was entered prior to leaving the house and the occupant has returned thereafter. The windows remain unarmed in case the owner wants to open the windows for ventilation. Thermostat setpoints of thermostats 1, 2 and 3 can be adjusted using the programs, for occupant comfort.

Lastly, the mode entitled OPEN allows access through any access point, while leaving the remainder of the system unaffected.

FIG. 8 is a flowchart of the process used in the central control panel to effect changes when a mode has been entered at one of the user operator panels. After starting at block 1205, decision block 1210 asks the question whether the mode has been changed at the operator panel. If not, the control panel returns to block 1210 and waits for a mode change.

If the mode has changed, another decision block, 1215, is reached. At decision block 1215, the process asks whether a reduction in security is occurring. A reduction in security for this process is defined as a point changing status from armed to on watch, armed to unarmed or on watch to unarmed. If the level of security would be decreased, the process determines whether the mode request is originated from inside or outside the protected space, as noted in decision block 1216. If the request is originated from outside the protected space, the request is denied and the process returns to block 1210. If the request is originated from inside the protected area, the process moves to block 1220. If no decrease in security occurs, the process goes directly from block 1215 to block 1220. Note that a security level decrease is defined as any point going from a higher level to a lower level. Thus, even if a mode lowers the level of only one point, and raises the level of all other points, this action would not be allowed from outside the protected area. In an alternative embodiment, the features of blocks 1215 and 1220 may be turned off by use of a pass code.

At decision block 1220, the control panel asks whether the lighting system requires any changes based on the mode entered. If the answer is yes, block 1225 indicates that the control panel makes the required changes for the selected mode and returns to the process at block 1230. If no lighting system changes are required, then the process continues on to block 1230 unimpeded.

At block 1230, the control panel determines whether the mode entered requires any thermostat changes. If thermostat changes are required, they are initiated at block 1235. Note that this may mean that a program is initiated which causes a temperature change to the initial mode change, coupled with a later temperature change in anticipation of reoccupancy of the house. The process then returns to decision block 1240. If no thermostat changes are required, the process moves on to decision block 1240 unimpeded.

At block 1240 the control panel asks whether security system changes are required. If the answer is yes, the control panel makes the required changes at block 1245. If the answer is no, then the process returns to block 1210, delays for a predetermined time, and starts again.

Note that all functions which are not a reduction in security which can be affected through use of an HSP remain as potential options through a remote telephone.

Figure 9:
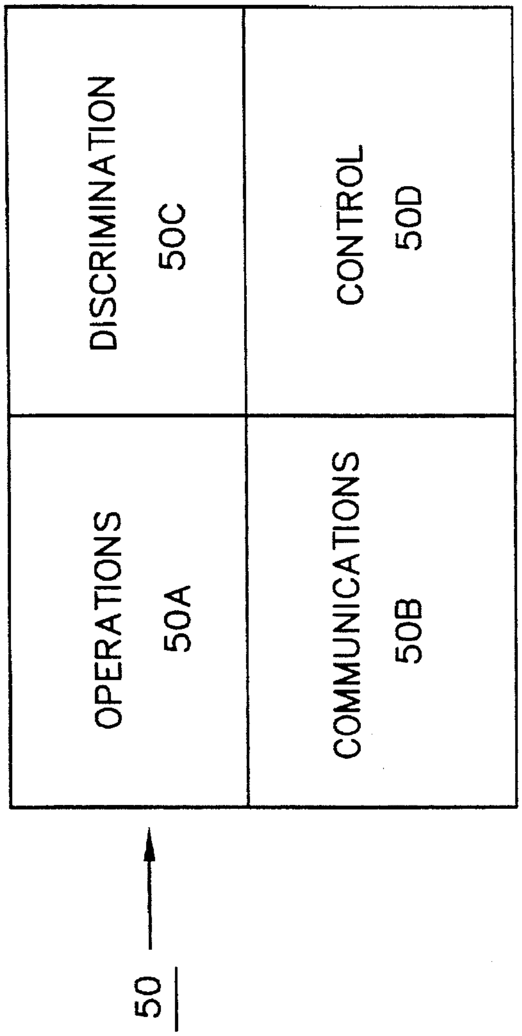
FIG. 9 is a block diagram of the processor 50.

Referring now to FIG. 9, thereshown is a block diagram of the processor 50 of the present invention. The processor can be divided into four important areas, operations 50A, communications 50B, discrimination 50C, and control 50D. The operations portion is responsible for the normal operations of the processor 50. Communications 50B, is responsible for the processors ability to communicate with other devices connected to lines 48 and 49 of FIG. 3*a*. Discrimination 50C is responsible for determining where received communications have originated and may be as equally well implemented as part of communications 50B. Control 50D is responsible for receiving instructions from memory 64, 66 and 68 and controlling the operations of the security system.

The foregoing has been a description of a novel and nonobvious system for automating the control of a space. The inventors do not intend for this description to be limiting, but instead describe their invention through the following claims.

We claim:

1. A security system for protecting an area, comprising:

at least one sensor for sensing alarm conditions and producing a condition signal representative of an alarm condition;

a processor connected to said sensor, said processor having a plurality of levels of security for each said at least one sensor and wherein each of said plurality of levels is associated in relation to user defined modes each such mode having an indication of how said processor will respond to each possible condition signal communicated from each said at least one sensor in the various modes, said plurality of levels being arranged in a prioritized sequence from highest to lowest level of security; each said at least one sensor being associated with only one of said levels at a time, said levels defining said processor's response to any condition signal which may be produced by any of said at least one sensors;

a control panel located within said area, said control panel for modifying said level associated with each said at least one sensor;

an interface for receiving signals originating from outside the protected area for modifying said level associated with each said at least one sensor;

a discriminator connected to said control panel and said interface, said discriminator determining whether a modification to said level associated with said sensor is coming from said control panel or said interface, and prohibiting a lowering of the security level of any of said at least one sensors if coming from said interface.

2. A system as set forth in claim 1 wherein said prohibiting of lowering of said security level in any of said at least one sensors is accomplished by said discriminator not responding to any signal coming from said interface.

3. A system as set forth in claim 2 wherein the response of said discriminator permits override upon the receipt by said discriminator of a predetermined code from said interface coming from outside said protected area.

4. A security system as set forth in claim 1 and in which the security system retains a preprogrammed call back number in a memory within the security system referencing an external communications device which accesses and is connected to said security system only through a public communications network such that the security system can return a call to said external communications device via said public communications network such that a user may lower the security level through said interface and said public communications network upon receipt by said security system of a proper identification signal received from said external communications device and sent to said interface, said security system further including a communications apparatus for initiating call-outs into the public communications network for allowing a user to send commands which will change modes and thus levels of security within the system.

5. A security system as set forth in claim 4 and in which the system retains a preprogrammed time limit in said memory which begins to run upon receipt of an appropriate code by said security system from said external communications device through said interface and said public communications network allowing said user to change modes of said security system until the expiry of said time limit.

6. A method of operation of a security system protecting an area having a sensor, a processor having a hierarchy of levels of security associated with the sensor, a memory for storing instructions, an internal control panel for modifying the level associated with the sensor, an interface for receiving signals from outside the area for modification of the level associated with the sensor and a discriminator for determining where a request has originated, comprising the steps of:

receiving a request for reduction of the security level associated with the sensor;

determining whether said request originated from the control panel or the interface;

reducing the level if the request came from within the protected area;

denying the request otherwise unless the signal is identified with a predetermined override code and in such event, lowering the security level as per request.

7. A method as set forth in claim 6 wherein: after the determining whether said request originated at the control panel or the interface; if said request originated at said interface the system, discontinues the communication from outside the protected area and calls back to an external communication device per instructions retained in the memory, and then tries to receive confirmation of the request or further instructions regarding the request from said outside location but if such are not received, discontinue the communication and do not change the level of security.

* * * * *